(12) United States Patent
Toyoda et al.

(10) Patent No.: US 7,991,218 B2
(45) Date of Patent: Aug. 2, 2011

(54) PATTERN MATCHING APPARATUS AND SEMICONDUCTOR INSPECTION SYSTEM USING THE SAME

(75) Inventors: Yasutaka Toyoda, Hitachi (JP); Takumichi Sutani, Hitachinaka (JP); Ryoichi Matsuoka, Yotsukaido (JP)

(73) Assignee: Hitachi High-Technologies Corporation, Tokyo (JP)

( * ) Notice: Subject to any disclaimer, the term of this patent is extended or adjusted under 35 U.S.C. 154(b) by 941 days.

(21) Appl. No.: 11/588,418

(22) Filed: Oct. 27, 2006

(65) Prior Publication Data

US 2007/0098248 A1    May 3, 2007

(30) Foreign Application Priority Data

Oct. 28, 2005  (JP) ................................. 2005-314853

(51) Int. Cl.
*G06K 9/62*          (2006.01)
(52) U.S. Cl. ........................................................ 382/151
(58) Field of Classification Search .................... 382/147
See application file for complete search history.

(56) References Cited

U.S. PATENT DOCUMENTS

| 4,379,308 | A | * | 4/1983 | Kosmowski et al. | ......... | 348/126 |
| 5,111,406 | A | * | 5/1992 | Zachman et al. | ............. | 700/160 |
| 6,366,688 | B1 | * | 4/2002 | Jun et al. | ....................... | 382/145 |
| 7,031,511 | B2 | * | 4/2006 | Asai | .............................. | 382/149 |

FOREIGN PATENT DOCUMENTS

| JP | 05-206238 | 8/1993 |
| JP | 7-260699 | 10/1995 |
| JP | 11-070922 | 3/1999 |
| JP | 2000-236007 | 8/2000 |
| JP | 2000-293690 | 10/2000 |
| JP | 2001-082931 | 3/2001 |
| JP | 2002-358509 A | 12/2002 |
| JP | 2006-126532 | 5/2006 |

OTHER PUBLICATIONS

Japanese Office Action issued in Japanese Patent Application No. JP 2005-314853 dated Oct. 5, 2010.
Lecture 10: Hough Circle Transform, Harvy Rhody, Chester F. Carlson Center for Imaging Science, Rochester Institute of Technology, Oct. 11, 2005.
Japanese Office Action issued in Japanese Patent Application No. JP 2005-314853 dated Mar. 1, 2011.

* cited by examiner

*Primary Examiner* — Brian P Werner
(74) *Attorney, Agent, or Firm* — McDermott Will & Emery LLP

(57) ABSTRACT

Solving means is configured of a signal input interface, a data calculation unit, and a signal output interface. The signal input interface allows image data which is obtained by photographing hole patterns, and CAD data which corresponds to hole patterns included in the image data, to be inputted. The data calculation unit includes: CAD hole-pattern central-position detection means which detects central positions respectively of hole patterns included in the CAD data from the CAD data, and which generates data which represents, with an image, the central positions of the respective hole patterns; pattern extraction means which extracts pattern data from the image data; image hole-pattern central-position detection means which detects central positions of the respective hole patterns in the image data from the pattern data, and which generates data which represents, with an image, the central positions of these hole patterns detected from the image data; and collation process means which detects positional data in the image data corresponding to that in the CAD data through a process of collating the CAD hole-pattern central-position data with the image hole-pattern central-position data. The signal output interface outputs the positional data outputted from the data calculation unit.

20 Claims, 15 Drawing Sheets

FIG. 6
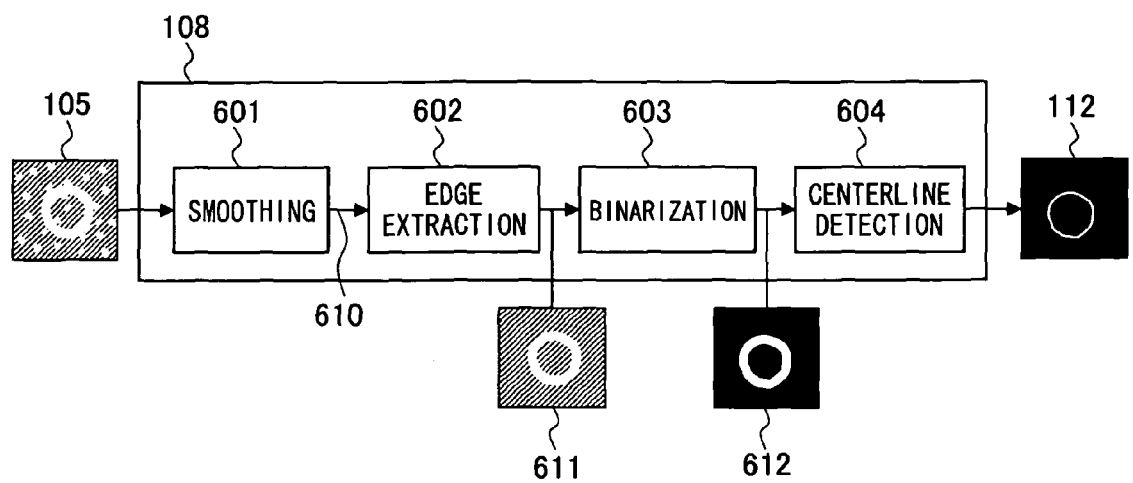
FIG. 7 A
| -1 | 2 | -1 |
|----|---|----|
| -1 | 2 | -1 |
| -1 | 2 | -1 |
FIG. 7 B
| -1 | -1 | -1 |
|----|----|----|
| 2  | 2  | 2  |
| -1 | -1 | -1 |
FIG. 8
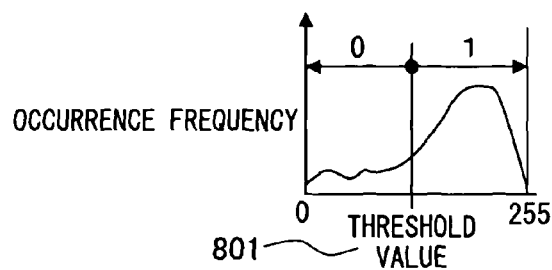

PATTERN MATCHING APPARATUS AND SEMICONDUCTOR INSPECTION SYSTEM USING THE SAME

BACKGROUND OF THE INVENTION

1. Field of the Invention

The present invention relates to a pattern matching technology. Particularly, the present invention relates to a pattern matching apparatus and a semiconductor inspection system which inspect patterns formed on a wafer by utilizing an image obtained by photographing a semiconductor device and CAD data for the semiconductor device.

2. Description of the Related Art

In recent years, there have been situations where manufacture of semiconductor devices is difficult because miniaturization and multilayering thereof have been progressed, and because logic thereof has been more complicated. As a result, there has been a tendency that failures thereof attributed to manufacturing processes occur frequently, and it has been important to accurately detect positions of the respective failures through inspection. The failures attributed to the manufacturing processes include pattern deformation due to an inappropriate light-exposure condition in a lithography process and a conduction failure due to a layer-to-layer misalignment. Locations of the respective failures of a semiconductor device can be detected through comparison and collation between CAD (Computer Aided Design) data for the semiconductor device and an actual pattern formed on a wafer.

Note that the CAD data is design data for the semiconductor device, and is data for determining a layout of patterns formed on the semiconductor device. While various data formats such as GDS and OASIS exist for the CAD data, these data formats commonly adopt what is termed as vector data format in which groups of characteristic points are described. This is because an amount of information on the patterns has been enormous as a result of high integration of the semiconductor devices. With any one of these formats, shapes of the patterns are recognized by having a semiconductor manufacturing apparatus or a semiconductor inspection apparatus, which utilizes the CAD data, render straight lines between the characteristic points.

As technologies for inspecting patterns by utilizing images from such CAD data and those of a semiconductor device, known are ones described in JP Hei 7-260699A and JP 2000-293690A.

For the purpose of automatically detecting a misalignment amount of a stage which transfers the semiconductor device to a photographing position of a microscope, these technologies are configured to performing a pattern matching process on patterns extracted from a photographed image and CAD data on patterns in an inspected position or CAD data on patterns whose positional relationship with the patterns in the inspected position is known, and to thereby detect positions in the image corresponding to that in the CAD data. As to this stage, an amount of movement thereof is controlled in a way that each of actual patterns, which corresponds to one of patterns in the CAD data, is centered in the photographed image. Accordingly, a distance between the detected position and a central position of the image is the misalignment amount. Based on this misalignment amount, each of the patterns in the inspected position is identified and measured.

However, pattern matching methods applied to the technologies described respectively in the aforementioned patent documents are configured to access geometric resemblance between patterns included in the CAD data and those included in the photographed image. Consequently, inspection can be performed with high accuracy when a degree of resemblance between a shape of each pattern in the CAD data and that on the semiconductor device is high. In this event, however, the following problem arises. When a shape of one of the patterns in CAD data and that formed on the semiconductor device are largely different from each other because of miniaturization, as in the case with a hole pattern, it is difficult to access a degree of resemblance between the positions of the respective patterns. Consequently, a position of the pattern in the image cannot be detected accurately, the position corresponding to a position of the pattern in the CAD data.

For example, FIG. 2A is a view showing CAD data on hole patterns. FIGS. 2B and 2C are views each showing an image obtained by photographing hole patterns, which is formed on a silicon wafer, by use of a scanning electron microscope (SEM). Pattern matching is performed by detecting, from any one of the images of FIGS. 2B and 2C, a region matching with that in the CAD data.

As to a shape of a hole pattern, a shape of an angular portion of a rectangle seen in a hole pattern in the CAD data cannot be reproduced due to a performance limit of an aligner, and the hole pattern is formed on the silicon wafer in a nearly circular shape. Additionally, due to variations in light-exposure conditions, the diameters of the respective hole patterns can be smaller as in the case shown in FIG. 2B, or be larger, as in the case shown in FIG. 2C, than the diameter of the hole pattern in the CAD data. Thus, each of shapes of a corresponding one of hole patterns in the CAD data and that of the hole patterns actually formed are largely different from each other. For this reason, as in the cases shown in FIGS. 2D and 2E, a deviation occurs between positions of the respective hole patterns in the CAD data and those of the hole patterns extracted from the image data. It is therefore difficult to accurately detect positions of the respective hole patterns in the image.

SUMMARY OF THE INVENTION

Against this background, an object of the present invention is to provide a pattern matching apparatus and a semiconductor inspection system which accurately detect positional information in image data even in a case where shapes of the respective hole patterns are largely deformed as compared to those in the CAD data, the positional information corresponding to that in the CAD data.

According to one aspect of the present invention, provided is a pattern matching apparatus which is characterized by including a pattern extraction unit which extracts pattern data on the basis of image data obtained by photographing hole patterns; a first central-position data detection unit which detects first central-position data on the hole patterns on the basis of the pattern data; a second central-position data detection unit which detects, on the basis of CAD data for the hole patterns, second central-position data on the hole patterns in the CAD data; and a first collation unit which collates the first central-position data with the second central-position data, and which detects positional information of the hole patterns in the image data, the positional information corresponding to that in the CAD data.

Each of hole shapes in the CAD data is nearly square, and each of via shapes is nearly circular due to expansion or contraction thereof. However, the centers of the respective shapes are virtually in the same position. Hence, pattern matching between the CAD data and the image data can be performed with high accuracy by collating the first central-position data with the second central-position data, and then by detecting the positional information in the image data corresponding to that in the CAD data.

It is preferable that the first central-position data detection unit be provided with an edge position detection unit for detecting edge positions in a corresponding one piece of the aforementioned pattern data; and a voting unit for rendering the hole patterns around the respective detected edge positions, each of the hole patterns being identical to the hole pattern to be detected, and that the first central-position data detection unit generate image data emphasizing central positions of the respective hole patterns of which shapes resemble shapes of the hole patterns which are to be detected, and which are included in the pattern data.

The pattern matching apparatus may be provided with an image data synthesis unit which superposes the image data, the CAD data and the first central-position data on one another on the basis of positional information in the image data corresponding to that in the CAD data. The data may be superposed on one another manually by a user of the apparatus, or may be automatically superposed on one another.

The pattern matching apparatus is characterized by further including a second collation unit which detects the positional information in the image data corresponding to that in the CAD data by collating the pattern data directly with the CAD data; a CAD data analysis unit which automatically determines, by analyzing the CAD data, that an inspection subject includes hole patterns; and a switching operation unit which performs pattern matching by switching the first and second collation units on the basis of a result of the analysis of the CAD data. Thus, it is made possible to automatically determine whether the inspection subject includes hole patterns.

According to a second aspect of the present invention, provided is a pattern matching apparatus which is characterized by including a pattern extraction unit which extracts pattern data on the basis of image data obtained by photographing hole patterns; a first central-position data detection unit which detects, first central-position data on the hole patterns on the basis of the pattern data; a second central-position data detection unit which detects, on the basis of CAD data for the pattern data, second central-position data on the hole patterns in the CAD data; and a first collation unit which collates the first central-position data with the second central-position data, and which detects positional information in the image data, the positional information corresponding to that in the CAD data. Accordingly, the positional information of the image data corresponding to that in the CAD data can be detected.

Additionally, provided is another pattern matching apparatus which is characterized by including a first central-position data detection unit which detects first central-position data on patterns on the basis of image data on the patterns; a second central-position data detection unit which detects second central-position data on patterns in CAD data on the basis of the CAD data used in forming the patterns; a collation unit which collates the first central-position data with the second central-position data, and which then detects positional information in the image data corresponding to that in the CAD data; and a pattern-type discrimination unit which, on the basis of the CAD data, detects that the image data to be inspected includes patterns respectively corresponding to those in the CAD data. Thereby, a detected pattern type can be discriminated.

Still another pattern matching apparatus is characterized by including a first central-position data detection unit which detects first central-position data on hole patterns based on the image data; a second central-position data detection unit which detects second central-position data on hole patterns in CAD data based on the CAD data used in forming the hole pattern; a collation unit which collates the first central-position data with the second central-position data, and which thereby detects positional information in the image data corresponding to that in the CAD data; and a hole pattern radius calculation unit which finds out a reference radius of each of the hole patterns on the basis of the CAD data, and which calculates, from the reference radius, a radius of each of the hole patterns in the image data. With this apparatus, each of hole pattern radii in image data on hole patterns can be estimated with high accuracy, Still another pattern matching apparatus includes a first central-position data detection unit which detects first central-position data on hole patterns on the basis of image data on the hole patterns; a second central-position data detection unit which detects second central-position data on hole patterns in CAD data on the basis of the CAD data used in forming the hole patterns; and a collation unit which collates the first central-position data with the second central-position data, and which thereby detects positional information in the image data corresponding to that in the CAD data. The pattern matching apparatus is characterized in that, through a voting process, the first central-position data detection unit detects, from the image data, central positions respectively of the plurality of hole patterns of which sizes are different from one another.

Additionally, provided is a semiconductor inspection system which is characterized by including an image data acquisition unit which acquires image data; a first central-position data detection unit which detects first central-position data on patterns on the basis of image data on the patterns acquired with the image data acquisition unit; a second central-position data detection unit which detects second central-position data on patterns in CAD data on the basis of the CAD data used in forming the patterns; and a collation unit which collates the first central-position data with the second central-position data, and which thereby detects positional information in the image data, the positional information corresponding to that in the CAD data.

Moreover, provided is another semiconductor inspection system which is characterized by including an image data acquisition unit which acquires image data; a first central-position data detection unit which detects first central-position data on patterns on the basis of image data on the patterns acquired with the image data acquisition unit; a second central-position data detection unit which detects second central-position data on patterns in CAD data on the basis of the CAD data in forming the patterns; a collation unit which collates the first central-position data with the second central-position data, and which thereby detects positional information in the image data corresponding to that in the CAD data; and a display control unit which performs control of displaying, on a display unit, a parameter window used for inputting various parameters, and a data reference window used for displaying: the CAD data, the image data based on the parameters; and a pattern matching result.

With this system, pattern matching can be efficiently performed.

The display control unit is characterized by performing control of displaying at least any one of an image obtained by superposing the image data, the CAD data, and the central-position data on a corresponding one of the patterns; and positional information in the CAD data corresponding to that in the image data. By performing display as described here, it is made possible to identify a position from which a corresponding one of the patterns is detected, and to determine with reference to which points the pattern has been detected.

According to the present invention, positional information in the image data corresponding to that in the CAD data can be accurately detected even in a case where shapes of the respective hole patterns in the image data has been largely deformed as compared to shapes of the respective hole patterns in the CAD data.

For example, by detecting central position data on the hole patterns respectively from the CAD data and from an SEM image, positional information in the image data corresponding to that in the CAD data can be detected through a collation process between the central position data thereof.

Moreover, by handling central position data on the hole patterns in the form of coordinate data, the present invention is more advantageous than a pattern matching apparatus of Example 1 in that it is possible to reduce an amount of data involved, and to shorten a collation process time.

BRIEF DESCRIPTION OF THE DRAWINGS

FIG. 6 shows a block diagram of pattern data extraction means.

FIGS. 7A and 7B are illustrations showing filter parameters used for extracting pattern data.

FIG. 8 is a view showing a histogram of image data used for extracting pattern data.

DETAILED DESCRIPTION OF THE EMBODIMENT

In the present description, a hole pattern refers to a pattern having a certain center as a reference.

The present inventors noted that, while hole shapes of the CAD data are nearly square, and via shapes are nearly circular due to expansion and contraction thereof, each of central positions of the respective hole shapes in the CAD data are virtually equivalent to a corresponding one of central positions of the respective via shapes.

Hereinbelow, explanations will be provided for a pattern matching technology according to an embodiment of the present invention. FIGS. 2A to 2J mentioned above include illustrations relating to operations of a pattern matching technology according to the embodiment of the present invention.

Figure 2:
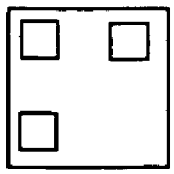
FIGS. 2A to 2J are illustrations showing CAD data and image data patterns of which are to be inspected.
Figure 2:
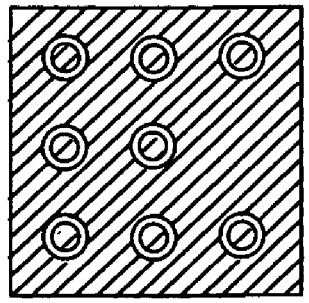
Figure 2:
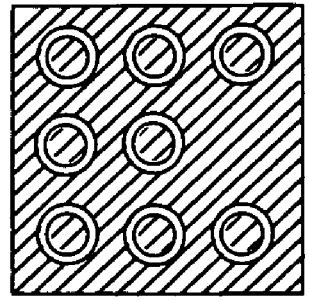
Figure 2:
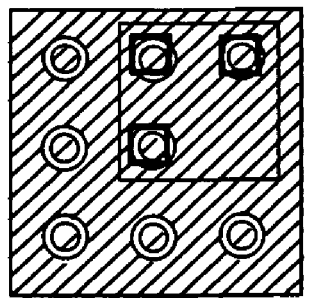
Figure 2:
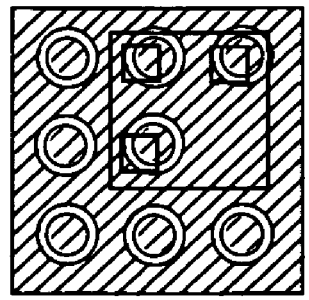
Figure 2:
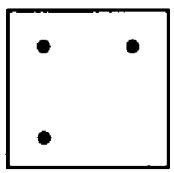
Figure 2:
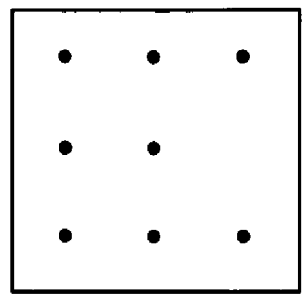
Figure 2:
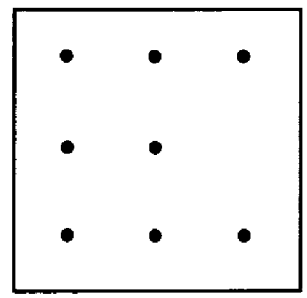
Figure 2:
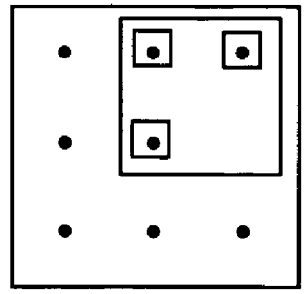
Figure 2:
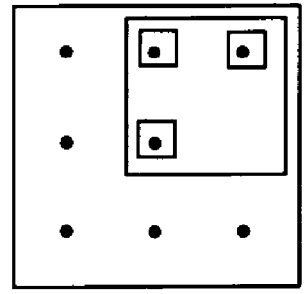

FIG. 2A is an illustration showing CAD data on hole patterns. FIGS. 2B and 2C are respectively images obtained by photographing, by use of a scanning electron microscope, hole patterns formed on a silicon wafer. The pattern matching technology according to this embodiment aims at detecting, from the CAD data of FIG. 2A, central positions of the respective hole patterns thereof as shown in FIG. 2F, and at detecting, from the hole patterns as shown in FIGS. 2B and 2C, each of central positions of a corresponding one of the hole patterns as shown in FIGS. 2G and 2H, respectively. Moreover, through a collation process utilizing these central positions, the pattern matching technology aims at accurately detecting positional information in image data corresponding to that in the CAD data as shown in FIGS. 2I and 2J even in a case where shapes respectively of hole patterns in the image data are largely different from shapes respectively of hole patterns in the CAD data. An outline of a pattern matching process according to this embodiment follows a flow described below.

1) Central positions respectively of vias (hole patterns) in CAD data are detected on the basis of an analysis on the CAD data, and a via central-position image of the CAD data is generated;

2), via radii within an inspected image with deformation of via shapes taken into consideration are estimated on the basis of the patterns in the CAD data, and on scaling information from an actual measurement apparatus such as an SEM;

3) through a circular voting process utilizing the estimated via radii, the inspected image is converted into a via central-position image; and 4) matching is performed between the via central-position images.

With this process, a process of registering via images is unnecessary, and the inspection can be automated. In addition, false detections due to variation in manufacture can be reduced because central positions are detected respectively from via patterns. Furthermore, even when the patterns are partially lost due to noise, the central positions thereof can be detected with high accuracy.

Explanations will be provided below for more concrete examples with reference to the drawings.

EXAMPLE 1

Example 1 of the present invention is a pattern matching technology in which central positions respectively of hole patterns in CAD data and those in image data are detected respectively from the CAD data and from the image data, and in which positional information in image data corresponding to that in the CAD data is detected through a collation process for the central positions in the image data with those in the CAD data.

Figure 1:
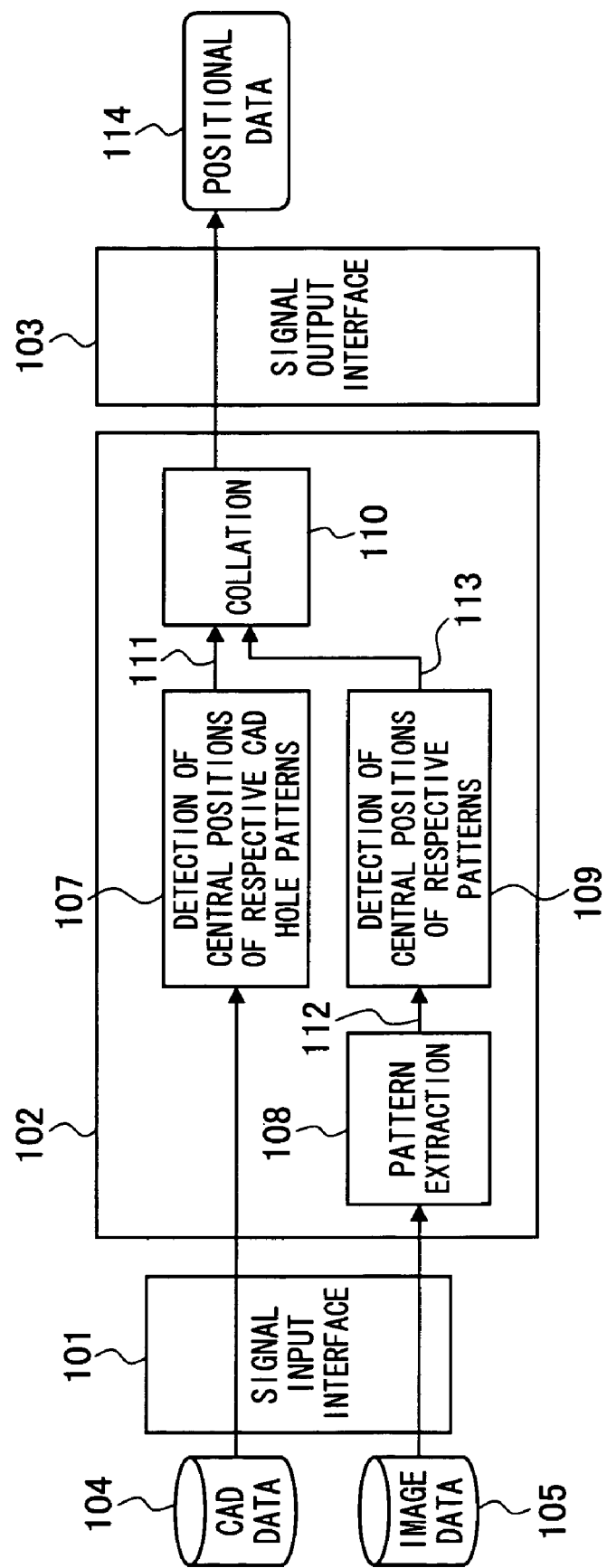
FIG. 1 is a block diagram showing one configuration example of a pattern matching apparatus according to Example 1 of the present invention.

FIG. 1 is a functional block diagram showing one configuration example of a pattern matching apparatus according to Example 1. As shown in FIG. 1, the pattern matching apparatus according to Example 1 is configured of a signal input interface 101; a data calculation unit 102; and a signal output interface 103. The signal input interface 101 allows image data 105 and CAD data 104 to be inputted. The image data 105 is obtained by photographing hole patterns, and the CAD data 104 corresponds to hole patterns included in the image data 105. The data calculation unit 102 includes CAD hole-pattern central position detection means 107 which detects, from the CAD data 104, central positions respectively of hole patterns included in the CAD data 104, and which generates data (hereinafter, referred to as CAD hole-pattern central-position data) 111 which represents, with an image, the central positions respectively of these hole patterns; pattern extraction means 108 which extracts pattern data 112 from the image data 105; image hole-pattern central-position detection means 109 which detects, from the pattern data 112, central positions respectively of hole patterns in the image data 105, and which generates data (hereinafter, referred to as image hole-pattern central-position data) 113 which represents, with an image, the central positions of these hole patterns detected from the image data 105; and collation process means 110 which detects positional data 114 in the image data 105 corresponding to the CAD data 104 through a process of collating the CAD hole-pattern central-position data 111 with the image hole-pattern central-position data 113. The signal output interface 103 outputs the positional data 114 outputted from the data calculation unit 102.

Figure 17:
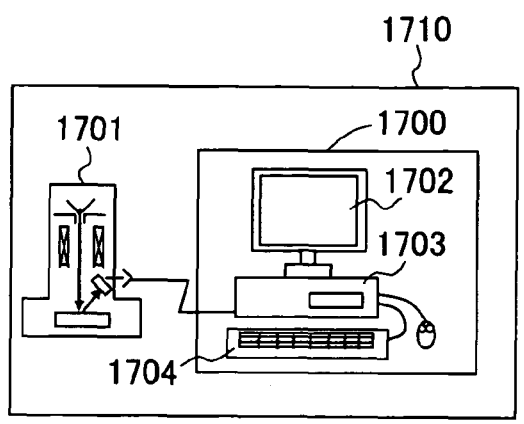
FIGS. 17A and 17B are illustrations showing a semiconductor inspection system incorporating the pattern matching apparatus according to this Example.
Figure 17:
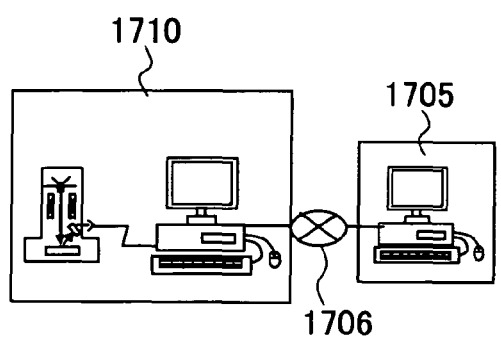

Functions described above can be realized, for example, by utilizing: a computer 1700 of a semiconductor inspection system 1710 shown in FIG. 17A; and a computer 1705 with which image data on hole patterns outputted from the semiconductor inspection system 1710 can be exchanged via network lines including that of the semiconductor inspection system 1710 and that of a local area network 1706, both shown in FIG. 17B, or via a storage device such as a hard disk or a compact disc.

Components of the semiconductor inspection system 1710 utilizing a composition of FIG. 17A will be described below as one example. The semiconductor inspection system 1710 is configured by including an SEM 1701 which photographs a semiconductor device to obtain image data 105; and the computer 1700 which controls the SEM 1701. The computer 1700 is an information processing apparatus represented by a personal computer and a workstation, and is composed of: data calculation means 1703 which executes control over the SEM 1701, and which executes pattern inspection according to the present invention; data input means 1704 through which information used for controlling the data calculation means 1703 is inputted; and data display means 1702 on which an image photographed by the SEM 1701, and information on the pattern inspection or the like, are displayed.

The data calculation means 1703 is composed by including: a memory which stores the CAD data 104, the image data 105 of a semiconductor device photographed by the SEM 1701, a control program for the SEM 1701, a software program defining each of the processing means of the data calculation unit 102 of the pattern matching apparatus, and the like; a CPU which executes programs; the signal input interface 101 used for inputting, into the data calculation means 1703, the CAD data 104 and the image data 105 outputted from the data input means 1704; and the signal output interface 103 used for outputting a pattern inspection result, the CAD data 104, and the image data 105 to the data display means 1702 such as a CRT or liquid crystal display. The data input means 1704 is realized in information input devices such as a key board and a mouse, and the data display means 1702 is an information display device such as a CRT or a liquid crystal display.

Note that interfaces, such as USB, IEEE1394, Centronics, a memory card, PCI, Ethernet and the like, can be used for the signal input interface 101 and the signal output interface 103, and that a data storage device, such as an SDRAM, a DRAM, a ROM, a memory card or a hard disk can be used for the memory.

Descriptions will be provided below for details of each of the components of the pattern matching apparatus according to Example 1 with reference to FIG. 1.

The signal input interface 101 constitutes an interface through which various data used for executing pattern inspection are inputted to the data calculation unit 102, and inputs, into the data calculation unit 102, the image data 105 of the semiconductor device to be inspected, and the CAD data 104 corresponding to the hole patterns detected from the image data 105. The data calculation unit 102 is configured to execute pattern inspection. Components of the data calculation unit 102 will be described below in detail. The CAD hole-pattern central-position detection means 107 detects, from hole patterns in the CAD data 104 shown in FIG. 2A, central positions of the CAD hole patterns shown in FIG. 2F, and generates the CAD hole-pattern central-position data 111.

As described above the CAD data 104 is data describing coordinate information of characteristic points of the patterns. Specifically, the CAD data 104 is data including a number of apexes of each of closed-figure patterns; and coordinates of the apexes, the coordinates aligned in the order of rendering the each pattern.

For example, a hole pattern as shown in FIG. 3A can be expressed as having five apexes and coordinate information of the five apexes (Although a number of apexes of a quadrangle is four, the hole pattern is being defined as having five coordinates for the apexes thereof, signifying that the quadrangle constitutes a closed figure.). For this reason, in a group of closed figures within the CAD data 104, the hole patterns shown in FIG. 3A is a hole pattern which is a closed figure, of which number of apexes is considered to be five, with distances respectively between four pairs of adjacent apexes, i.e., four sides of the hole pattern, being the same as one another; and with lengths of diagonals 302 respectively from a point A to a point C, and from a point B to a point D being the same as each other. A central position of each of the CAD hole patterns can be found by detecting intersection coordinates 301 of the diagonals 302, as shown in FIG. 3C. In the case of the example in FIGS. 3A to 3C, the central position of the CAD hole pattern is (xa+(xb−xa)/2, ya+(yc−ya)/2). From the CAD data 104, central positions of the hole patterns can be calculated through such simple coordinate calculation.

The CAD hole-pattern central-position detection means 107 detects the central positions of the CAD hole patterns in the CAD data 104, and generates the CAD hole-pattern central-position data 111. Note that, in Example 1, explanations will be provided by exemplifying a case where the CAD hole-pattern central-position data 111 is generated in the form of bit-mapped image.

Because coordinate information of the CAD data 104 are described in an actual pattern size of the semiconductor device, it is necessary to convert coordinate information of the CAD hole pattern central positions, which have been detected from the CAD data 104, into coordinate information on the image data 111. For the conversion of the coordinate information, a photographing magnification of a photographing apparatus, which is used to take the image data 105 to be inspected, is utilized.

In a case where the semiconductor device is photographed with the SEM 1701, a photographing magnification of the SEM 1701 is generally defined by actual pattern dimensions of the semiconductor device and observation dimensions of the image data 105. For example, in a case where the image data 105 is observed on an image display apparatus such as a CRT or a liquid crystal display, dimensions of a display window of the image data is the observation dimensions. In a case where the observation dimensions and the photographing magnification of the SEM 1701 are 10,000 μM×10,000 μM, and 10,000×, respectively, it can be said that the image data 105 has been obtained by photographing a range (hereinafter, referred to as field-of-view dimensions) of 1 μM×1 μM on the semiconductor device.

Figure 4:
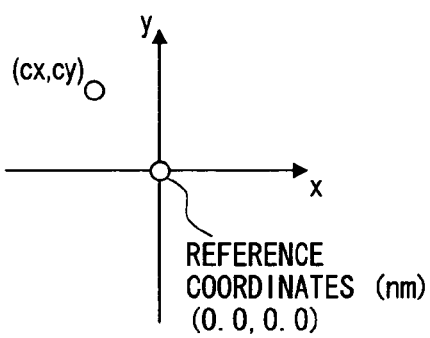
FIGS. 4A and 4B are diagrams showing a procedure of converting CAD data into image data.
Figure 4:
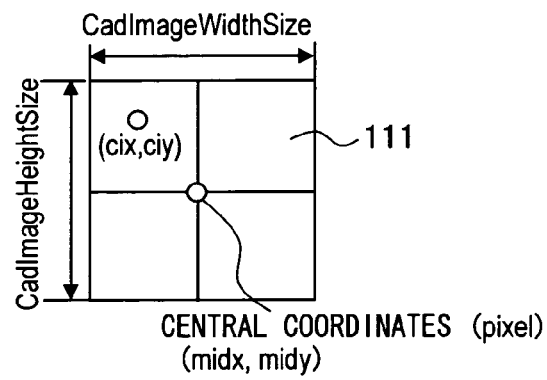

Utilizing FIGS. 4A and 4B, a procedure for imaging one point of central coordinates of a hole pattern will be described. In this example, an explanation will be provided for a case where, by causing reference coordinates (0.0 nm, 0.0 nm), as shown in FIG. 4A, of the CAD data 104 to correspond to central coordinates (midx, midy) as shown in FIG. 4B of the CAD hole-pattern central-position data 111, a central position of the CAD hole pattern is plotted in the CAD hole-pattern central-position data 111 having the image dimensions of CadImageWidthSize×CadImageHeightSize.

First of all, dimensions (PixelSizeX, PixelSizeY) in the semiconductor device to be expressed by one pixel in the CAD hole-pattern central-position data 111 are calculated on the bases of equations (1) by utilizing a photographing magnification for the image data 105. In a case where the observation dimensions (ReferenceSizeX, ReferenceSizeY) of the image data 105, the dimensions (SemImageWidthSize, SemImageHeightSize) of the image data 105, and the photographing magnification (Magnification) for the image data 105 are, for example, 10,000 μM×10,000 μM, 500×500 pixels, and 10,000x, respectively, the dimensions in the semiconductor device to be expressed by one pixel in the CAD hole-pattern central-position data 111 is PixelSizeX=PixelSizeY=0.002 μm (2 nm).

Hole pattern central coordinates (cix, ciy) in the CAD hole-pattern central-position data 111 are calculated on the bases of equations (2) from CAD hole-pattern central coordinates (cx, cy) detected from the CAD data 104; PixelSizeX; PixelSizeY; and central coordinates (midx, midy) of the CAD hole-pattern central-position data 111. In a case where, for example, the CAD hole-pattern central coordinates detected from the CAD data 104 under the above described conditions are (−30 nm, 40 mn), the coordinates (cix, ciy) of the CAD hole-pattern central position on the image data 111 is (35 pixels, 30 pixels) when PixelSizeX=PixelSizeY 0.002 μm; and dimensions (CadImageWidthSize, CadImageHeightSize) of the image data 111, which are used to plot a central position of the CAD hole-pattern, are 100×100 pixels.

$$PixelSizeX = (ReferenceSizeX/Magnification)/SemImageWidthSize$$

$$PixelSizeY = (ReferenceSizeY/Magnification)/SemImageHeightSize \quad \text{Equations (1)}$$

$$cix = cx/PixelSizeX + midx$$

$$ciy = cy/PixelSizeY + midy \quad \text{Equations (2)}$$

In equations (1) and (2),
midx=CadImageWidthSize/2;
midy=CadImageHeightSize/2;
cix denotes an x coordinate (in pixels) of the CAD hole pattern center in the image data;
ciy, a y coordinate (in pixels) of the CAD hole pattern center in the image data;
cx, an x coordinate of the CAD hole pattern center detected from the CAD data;
cy, a y coordinate of the CAD hole pattern center detected from the CAD data;
PixelSizeX, a dimension (in nm, μm or the like) of the semiconductor device in the x-axis direction, the dimension being expressed by one pixel;
PixelSizeY, a dimension (in nm, μm or the like) of the semiconductor device in the y-axis direction, the dimension being expressed by the pixel;
Magnification, a magnification used when an SEM image to be inspected is aquired;
ReferenceSizeX, an observation dimension (in nm, μm or the like) in the x-axis direction;
ReferenceSizeY, an observation dimension (in nm, μm or the like) in the y-axis direction;
SemImageWidthSize, a dimension (in pixels) of the SEM image in the x-axis direction;
SemImageHeightSize, a dimension (in pixels) of the SEM image in the y-axis direction;
CadImageWidthSize, a dimension (in pixels), in the x-axis direction, of an image which is used to plot the CAD hole-pattern central position;
CadImageHeightSize, a dimension (in pixels), in the y-axis direction, of the image which is used to plot the CAD hole-pattern central position;
midx, a central coordinate (in pixels), in the x-axis direction, of the image which is used to plot the CAD hole-pattern central position; and
mixy, a central coordinate (in pixels), in the y-axis direction, of the image which is used to plot the CAD hole-pattern central position.

Based on the information thus detected on the central coordinates of the hole pattern on the image, generated is the image data 111 in which, for example, a pixel value corresponding to the CAD hole-pattern central position, and a pixel value not corresponding thereto are set at "1," and at "0," respectively. Thereby, the CAD hole-pattern central-position data 111 which indicates the CAD hole-pattern central position, and which has 1 bit/pixel, is generated.

Figure 5:
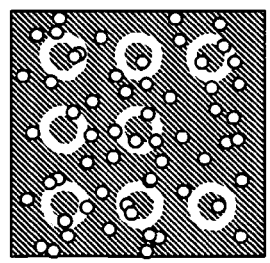
FIGS. 5A and 5B are illustrations showing image data to be inspected.
Figure 5:
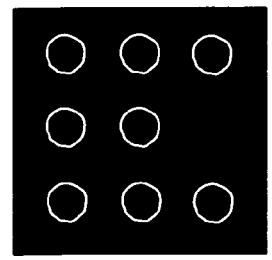
Figure 9:
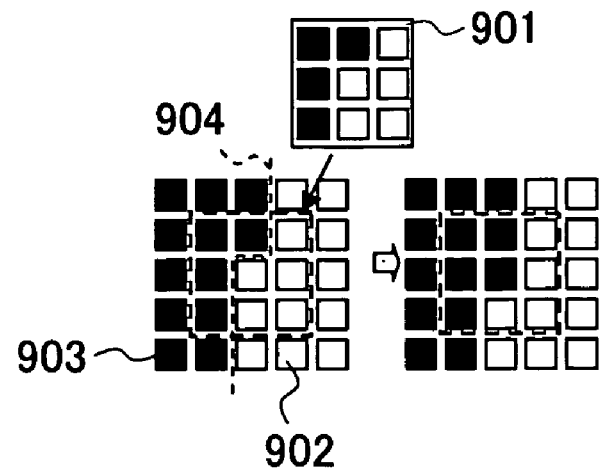
FIG. 9 is an illustration showing a procedure of thinning used for extracting pattern data.

The pattern extraction means 108 is configured to extract, from the image data 105 as shown in FIG. 5A, the pattern data 112 as shown in FIG. 5B indicating shapes of the respective hole patterns. In the image data 105 (in particular, image data obtained by photographing an image with an SEM), a lot of noise, as indicated with open circles in FIG. 5A, are superposed in the course of the photographing. It is therefore difficult to detect central positions of the hole patterns directly from this image. Consequently, information on the patterns is extracted from the image date 105. A process of extracting the pattern information from the image data 105 can be realized with a combination of general image processing techniques. For example, the pattern information can be extracted by use of means as shown in FIG. 6.

FIG. 6 shows a procedure of extracting the pattern data 112 from the image data 105. Smoothing means 601 is configured to eliminate noise components included in the image data 105. The smoothing means 601 is such a filtering process that finds an average of intensities in a two-dimensional image area of 3×3 pixels, and outputs the average as an intensity value of a central position of the image area. Thereby, sporadic noise can be eliminated. Incidentally, a conventional general method can be used as a method of the smoothing.

Edge extraction means 602 is a filtering process where a background area and a pattern area in a smoothed image 610 are separated from each other. Various methods have been proposed for the edge extraction means 602, and the edge extraction means 602 is not limited to any one of the proposed methods. However, a pattern extraction method using filter operators as shown in FIGS. 7A and 7B will be described as one example. FIG. 7A shows a filter operator used for detecting a pattern extending vertically to an image, and FIG. 7B shows a filter operator used for detecting a pattern extending horizontally to the image. The edge extraction means 602 is a process in which, by applying any one of these filter operators to an area of 3×3 pixels which constitutes an image, an intensity value of a pixel in a central position of the area is obtained through a sum-of-product calculation of coefficients of the filter operator and intensity values of the pixels, the intensity values corresponding respectively to positions of the coefficients. In a case where the filtering process is performed on the smoothed image 610 by using the operator shown in FIG. 7A, an image where a pattern extending vertically with respect to a screen is emphasized can be generated. On the other hand, in a case where the filtering process is performed on the smoothed image 610 by using the operator shown in FIG. 7B, an image where a pattern extending horizontally with respect to a screen is emphasized can be generated. Thereafter, filtering processes respectively through the two filter operators are preformed on the smoothed image 610, and the two filtering results from each of the pixels are compared with each other. Thereby, an image obtained by selecting a larger value (a value by which a pattern is emphasized) of the two filtering results is generated. Accordingly, an edge image 611 in which a pattern extending vertically and horizontally is emphasized can be obtained. Incidentally, a conventional general method can be used as a method of the edge extraction.

Next, the edge image 611 is converted into a binarized image 612. The edge image 611 is a multiple-valued image generated through the sum-of-product calculation process, and includes small noise components. For this reason, a binarization process using a threshold value is performed on the edge image 611 to convert the edge image 611 in the form of the multiple-valued image into that of the binarized image. Thereby, the background area and the pattern area of the edge image 611 are completely separated from each other. Various methods are proposed also for binarization processing means 603, and the binarization processing means 603 is not limited to any one of the proposed methods. However, the binarization processing means 603 using a fixed threshold value will be described as one example. FIG. 8 is a graph called a histogram, where an intensity range (between 0 to 255, for example, for the image having 8 bits/pixel) of an image is indicated on a horizontal axis; and a total number of pixels (10,000 at the maximum, for example, for the image of 100× 100 pixels) of the respective intensities existing in the image is indicated on a vertical axis. The histogram is generally used for the purpose of conveniently grasping characteristics of an image. In the edge image 611, pixels in the pattern area have high intensity values, and pixels in the other area have low intensity values. Accordingly, the binarization can be performed by providing a threshold value 801, and by setting intensity values respectively of pixels having intensities higher than the threshold value 801 to be a pattern area "1," and intensity values respectively of pixels having intensities lower than the threshold value 801 to be a background area "0."

In general, the threshold value 801 is obtained empirically by assessing several images used for the binarization. In addition to the binarization using a fixed threshold value, there is a binarization processing method in which a threshold value favorably separating the pattern area from the other area by use of a variance in the histogram is automatically found, and a binarization processing method used in Example 1 is not limited to any one of the above methods. Incidentally, a conventional general method can be used as the binarization processing method.

There is a case where a pattern in the binarized image 612 has a width of several pixels depending on a setup for the threshold value 801. Identification of a central position of the hole pattern is possible as it is. However, the pattern is converted into a pattern having a width of one pixel in order to detect the central position of the hole pattern with ease. Various methods have been proposed for a method of conversion as described above, and the conversion method is not limited to any one of the proposed methods. However, a conversion method using thinning will be described as one example.

A thinning process is a process of repeating the following operation. In a case where an area matching with that in the template image 901 is detected from the binary image 612 by use of a plurality of template images 901 each locally indicating a border between a pattern 902 and a background 903, a pixel of a central position 904 of the area is replaced with the intensity value for the background area. The operation is repeated until a width of the pattern is a single center line. With this process, the pattern data 112 formed of the single-pixel width can be generated. Note that a conventional general method can be used as a method of obtaining the center line of the pattern.

The image hole-pattern central-position detection means 109 detects central positions of the respective hole patterns from the pattern data 112 outputted from the pattern extraction means 108, and generates the image hole-pattern central-position data 113. Although there are various image processing methods in which central positions respectively of nearly circular patterns are detected, a method of detecting the central position by use of a voting process will be described in Example 1. The voting process is a process for detecting, from the image data, a position of an image having a previously defined pattern shape.

Figure 10:
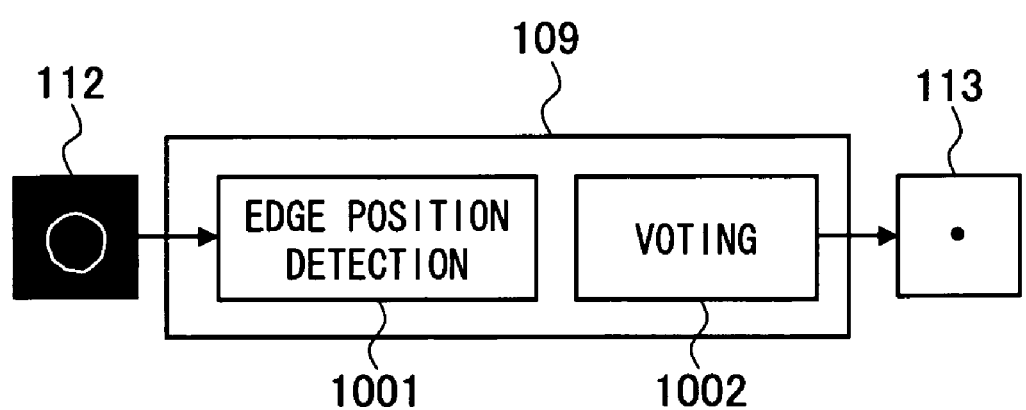
FIG. 10 is a block diagram showing image hole-pattern central position detection means.

FIG. 10 shows procedure of detecting a central position of an image hole pattern by use of the voting process. FIG. 11A to FIG. 11D each show contents of the voting process.

Figure 11D:
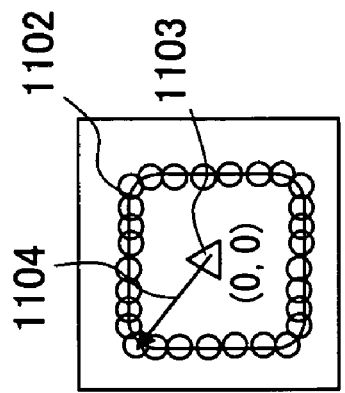
FIGS. 11A to 11D are illustrations showing a method of circular voting.
Figure 11C:
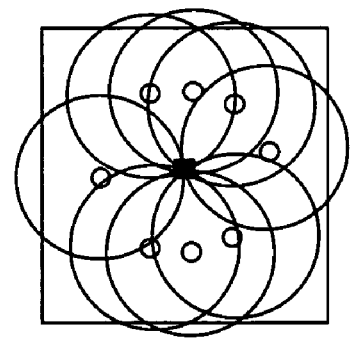
Figure 11B:
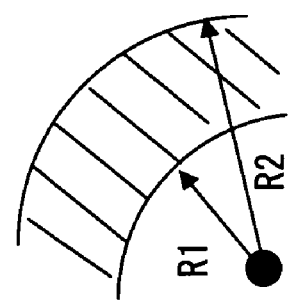
Figure 11A:
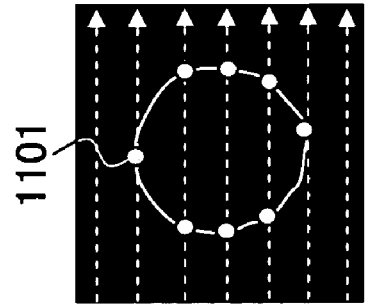

First, as shown in FIG. 11A, edge pixel positions 1101 are detected from one of the patterns in the pattern data 112 by an edge pixel position detection unit 1001. Next, by a voting unit 1002, a circular pattern having a radius R is plotted around one of the edge pixel positions in the voting data, as shown in FIG. 11B, the voting data having the same dimensions as those of the image. This rendering process is performed on all of the edge pixel positions of the pattern in the pattern in the pattern data 112. At this point, when the rendering is performed, not only the pattern is overwritten, but also a number of times when the circular pattern has been plotted is stored in the voting data. This is called a voting process. As a result, in a case where a circular pattern having a radius R is included in the pattern data 112, it is made possible to generate the voting data in which a vote value of a central position of the circular pattern is high, and in which voting values in the other area are low. This voting data is data indicating a central position of the circular pattern.

The voting process is characterized in that each of central positions of a corresponding one of patterns can be detected even in a case where the pattern data 112 is partially lost by an influence of noise included in the image data 105. The voting process is therefore effective means in pattern inspection.

However, there is a case where shapes of the respective hole patterns actually formed on a wafer are expanded or contracted as compared to those of the hole patterns in the CAD data 104. There is also a case where hole patterns mutually having different sizes exist in the image data 105. In any one of such cases, by previously setting variation limits R1 and R2 for these hole patterns, and by sequentially rendering circular patterns respectively having radii of R1 to R2, as shown in FIG. 11C, central positions of the respective circular patterns can be detected even in a case where circular patterns respectively having radii of R1 to R2 are included in the image data.

Figure 12:
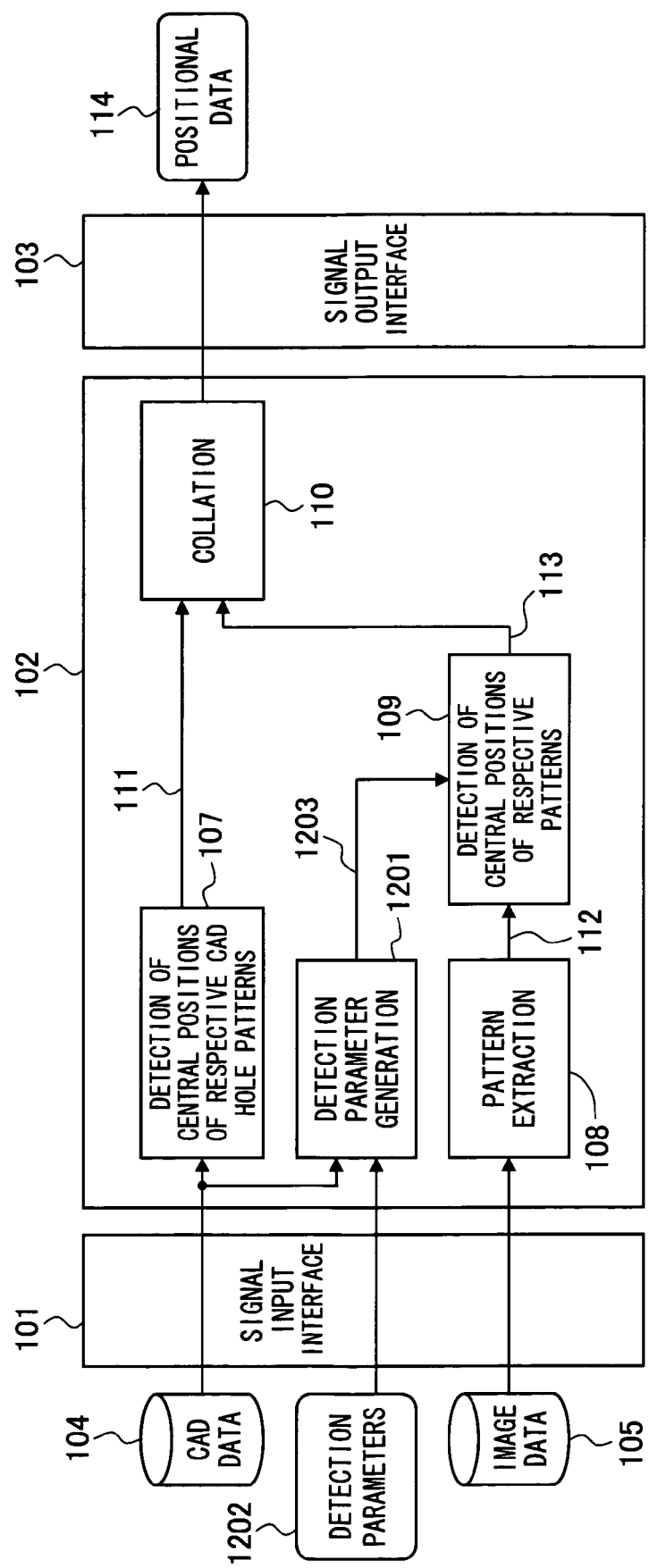
FIG. 12 is a block diagram showing a pattern matching apparatus of the present invention, which is described in Example 1, for automatically extracting, from CAD data, parameters used in a voting process.

Note that a parameter (hereinafter, referred to as a pattern detection parameter) for the radius R of each of the hole patterns used in the voting process can be automatically detected from the CAD data 104 by providing detection parameter generation means 1201 to the configuration shown in FIG. 1. A pattern matching apparatus including the detection parameter generation means 1201 is shown in FIG. 12.

Figure 3:
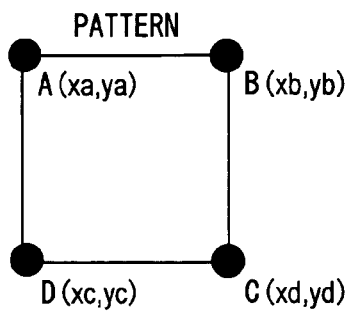
FIGS. 3A to 3C are diagrams showing data formats of CAD data.
Figure 3:
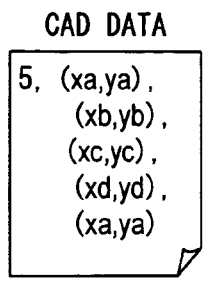
Figure 3:
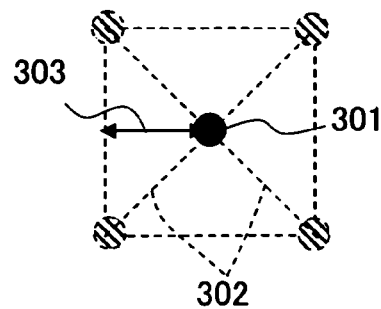

The detection parameter generation means 1201 is configured to generate a pattern detection parameter 1203 used for detecting central positions of the respective image hole patterns. Specifically, as in the case with the CAD hole-pattern central-position detection means 107, central coordinates of each of the CAD hole patterns are obtained from the CAD data 104. Next, as shown in FIG. 3, the shortest distance 303 between a point of the central coordinates of each of the CAD hole patterns and one of its sides each connecting two of the apexes of the CAD hole pattern is computed. The computed distance is converted into a distance in the CAD hole-pattern central-position data 111, and the thus obtained distance is set as a reference radius of the hole pattern.

Thereby, the pattern detection parameter 1203 used in the image hole-pattern central-position detection means 109 can be automatically set up. In a case where hole patterns mutually having different sizes are included in the CAD data 104, a minimum and maximum values of radii of the respective hole patterns in the CAD data 104 are obtained. Minimum and maximum values of the radii are outputted, from the detection parameter generation means 1201, as the pattern detection parameters 1203 respectively for the radii R1 and R2. By performing the voting process in a form as shown in FIG. 11C with the image hole-pattern central-position detection means 109 by using the radii R1 and R2, central positions respectively of circular patterns each having the radius in a range of R1 to R2 can be detected from the image data 105.

Furthermore, in a case where shapes of the respective hole patterns included in the image data 105 may possibly be expanded or contracted, the variation limits R1 and R2 of each of the radii to the reference radius can be computed by the detection parameter generation means 1201. The variation range of R1 to R2 can be outputted, as the pattern detection parameter 1203, to the image hole-pattern central-position detection means 109. In this case, the variation limits R1 and R2 is computed by previously preparing variation values m and n (m % to n % where m<n) for the reference radius 1203 respectively as fixed values, and by using the reference radius 1203 and the variation values m and n thereof. For example, when it is supposed that the reference radius detected from the CAD data 104 is expressed as r, and that the variation values for the reference radius 1203 are respectively expressed as m % and n % (m<n), R1 and R2 can be obtained respectively as R1=r×m/100, and R2=r×n/100.

The variation values m and n, and variation limits R1 and R2 may be respectively treated as fixed values, or can be respectively inputted as inspection parameters 1202 through a signal input interface operated by an operator.

Figure 13:
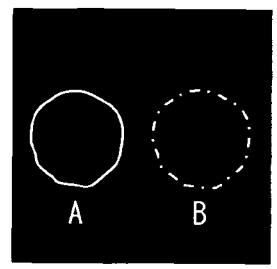
FIGS. 13A to 13E show a procedure of identifying central positions respectively of hole patterns.
Figure 13:
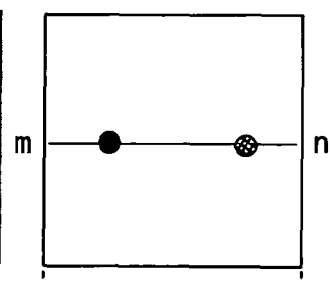
Figure 13:
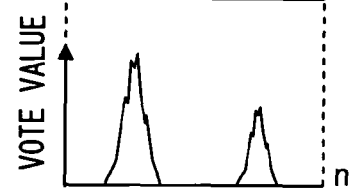
Figure 13:
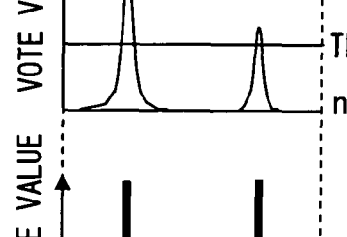
Figure 13:
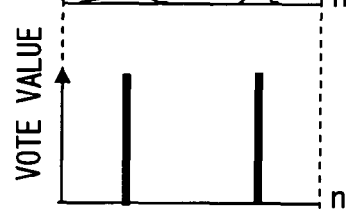

FIGS. 13A to 13E are illustrations showing hole patterns, and vote data on the hole patterns obtained through a voting process. FIG. 13B shows voting data generated through the voting process on the pattern data 112, in which two hole patterns A and B as shown in FIG. 13A exist. In FIG. 13B, each of blackened portions in the voting data indicates an area for which a vote value is high, i.e., an area in which each of the central positions of a corresponding one of the circular patterns exists. In a case where the pattern data 112 has complete circular patterns each having the radius R which is designated at the voting, vote values concentrate on central positions of the respective circular patterns. However, in many cases, shapes of the respective hole patterns formed on a wafer are not complete circular patterns, but are locally distorted due to variations in light-exposure conditions, and due to influences from neighboring patterns. Additionally, in some cases, hole patterns formed on the wafer may be each formed in a shape close to that of each of hope patterns in the CAD data 104, i.e., in a shape of a rectangle with rounded angles. For this reason, a result of the voting process forms, as shown in FIG. 13C (a graph of vote values for one line drawn between m and n in FIG. 13B), a data distribution where the vote values are gradually smaller with the highest value thereof at each of positions which is seemingly one of centers of a corresponding one of the circular patterns. Furthermore, minute pieces of noise sometimes occur in voting data depending on magnitudes of distortion. The hole pattern B in FIG. 13A is an example of a pattern of which losses are more extreme than those of the hole pattern A due to noise superposed on the image data 105. Because voting is performed on each of edge points constituting a pattern, a vote value for each of central positions of a corresponding one of the hole patterns varies depending on a total number of the edges constituting the pattern.

Figure 14:
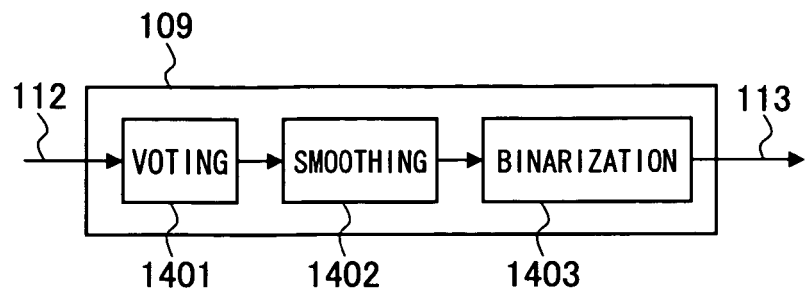
FIGS. 14A and 14B are diagrams showing a procedure of detecting a central position of a hole pattern from image data.
Figure 14:
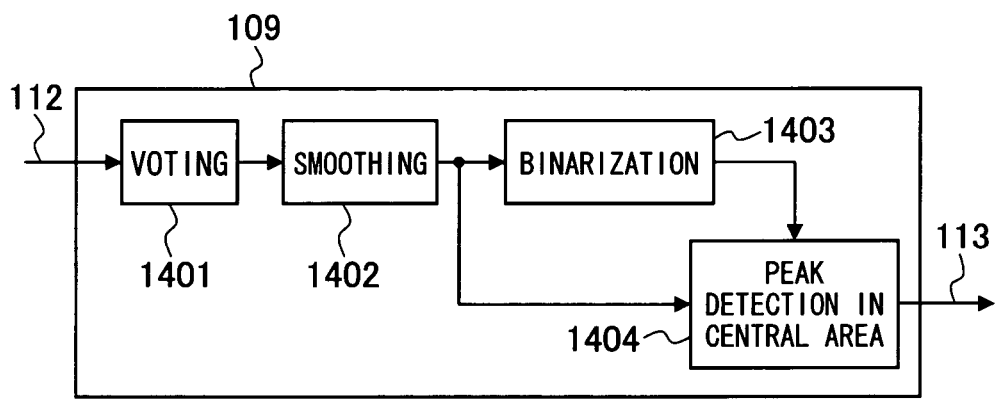

With the above described issues taken into consideration, the minute pieces of noise generated due to the distortion are reduced in the following manner. As shown in FIG. 13D, noise on the voting data can be reduced, for example, by locally averaging the voting data. With respect to magnitudes of the vote values, a threshold value as shown in FIG. 13D is provided, and areas having higher vote values than the threshold value are respectively determined as central positions "1," and the other areas as "0." Thereby, as shown in FIG. 13E, the image hole-pattern central-position data 113 can be generated irrespective of the magnitudes of the respective voting values. This can be realized with a general image processing method as shown in FIG. 14A. Voting is performed on the pattern data 112 by voting process means 1401, local averages of the voting data are obtained by smoothing means 1402, and the image hole-pattern central-position data 113 is generated by binarization means 1403 by use of the threshold value.

In a case where image of each of the centers of a corresponding one of the image hole patterns is generated by the method shown in FIG. 14A, a central position of the hole pattern may extend across more than one pixel. With respect to the central position of the hole pattern which has been detected from the pattern data 112, local deformations of the hole pattern make it difficult to detect exact central positions each having a single-pixel width. However, in a case where any one of the central positions of a corresponding one of the hole patterns has been detected as a very large area formed of a plurality of pixels, there is a possibility that collation thereof cannot be accurately performed. For this reason, as shown in FIG. 14B, areas of the central positions of the respective hole patterns are confined, for example, by masking a result of the smoothing with a result of the binarization. Furthermore, by obtaining, through peak detection 1404, positions respectively having large vote values, the image hole-pattern central-position data 113 for each of the image hole patterns can be generated, each of the central positions thereof having a single-pixel width. Note that a range of each of the central positions is adjustable, for example, by adding a process in which central positions, each with the single-pixel width, of the respective image hole patterns are obtained in the above described manner; and several pixels, which surrounds the central positions thus found, are set anew as the central positions.

Incidentally, the central positions respectively of patterns can be detected as long as the shapes of the respective patterns are vertically and laterally symmetric, the shapes including a rectangle or a square in addition to that of a circular pattern. Specifically, as shown in FIG. 11D, each of vectors 1104 from a central position 1103 of a detection subject pattern 1102 to one of positions of the respective pixels forming the pattern 1102 is stored for all of the pixels forming the pattern 1102. At the voting process, voting is performed from edge positions in the pattern data 112 respectively to positions of pixels of voting data existing on the vectors 114. This means that patterns having the same shape as the pattern to be detected are sequentially voted to the voting data around each of the edge positions in the pattern data 112. Thereby, a central position of the patterns having the same shape as the pattern 1102 can be detected from the pattern data 112. In a case where the hole patterns are formed respectively in shapes relatively close to those of the hole patterns in the CAD data, or where the hole patterns are formed in an elliptical shapes, it suffices that the voting technique as described above be used. As in the case with the voting technique for circular patterns, the expansion and contraction of the patterns can be dealt with by voting a plurality of patterns in which lengths of the respective vectors are varied. Also in this voting technique, parameters can be automatically detected from the CAD data. In the detection parameter generation means 1201, a central position of each of the patterns, and vectors from the central position of the each pattern to pixels forming the pattern, are detected. In the hole-pattern central-position detection means 109, voting is performed by using the vectors.

A detection method of hole pattern positions in the image hole-pattern central-position detection means 109 is not limited to this voting process method. For example, each of lengths between the edges facing each other in the longitudinal direction is measured, and an edge-to-edge straight line having the longest length among these lengths is obtained. Similarly, each of lengths between the edges facing each other in the lateral direction is measured, and an edge-to-edge straight line having the longest length among these lengths is obtained. It is possible to consider the intersection of these straight lines to be a central position of a hole pattern.

Figure 15:
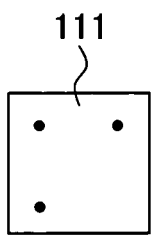
FIGS. 15A to 15C are illustrations showing a collation procedure.
Figure 15:
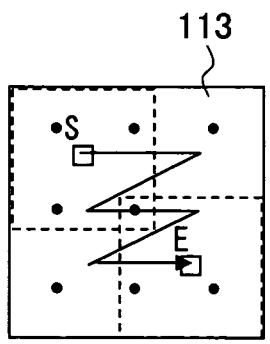
Figure 15:
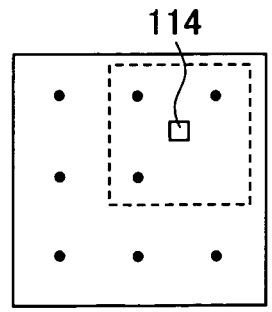

The collation process means 110 is configured to carry out a process of collating the CAD hole-pattern central-position data 111 as shown in FIG. 15A generated in the CAD hole-pattern central-position detection means 107, with the image hole-pattern central-position data 113 as shown in FIG. 15B generated in the image hole-pattern central-position detection means 109. Thereby, as shown in FIG. 15C, the position data 114 in the image data corresponding to the CAD data 104 is detected. The CAD hole-pattern central-position detection means 107 and the image hole-pattern central-position detection means 109, which are mentioned above, have respectively generated the two image data in each of which central positions of the respective hole patterns have been set as "1," and other areas thereof have been set as "0." For this reason, the collation process between these two image data with each other is carried out.

A method of the collation process between two image data with each other is not limited because there exist various publicly known technologies therefore. However, the position data 114 in the image data corresponding to the CAD data can be detected, for example, in the following manner. From a point S to a point E in the image hole-pattern central-position data 113 as shown in FIG. 15B, matching degree of each point with a corresponding one of areas in the image hole-pattern central-position data 113 each having the same size as that of the CAD hole-pattern central-position data 111 as shown in FIG. 15A. Thereafter, an area having the highest matching degree among these areas is determined as positional information corresponding to that in the CAD hole-pattern central-position data 111. Each of the matching degrees can be computed by performing a sum-of-product calculation on pixel values of the CAD hole-pattern central-position data 111, and of an area of the image hole-pattern central-position data 113 for which the matching degree is computed. That is, the calculation results in "1" in a case where central positions of the respective hole patterns exist in both of the CAD hole-pattern central-position data 111 and the area of the image hole-pattern central-position data 113. The calculation results in "0" in a case where any one of the CAD hole-pattern central-position data 111 and the foregoing area is an area not including a hole pattern central position. In an example shown in FIGS. 15A to 15C, in a case where each of the CAD hole-pattern central-position data 111 and the image hole-pattern central-position data 113 expresses a hole pattern central position within a single-pixel range, a position where one of central positions in the image hole-pattern central-position data 113 matches with that in the CAD hole-pattern central-position data 111 for three pixels is the positional data 114 in the image data corresponding to the CAD data.

Figure 16:
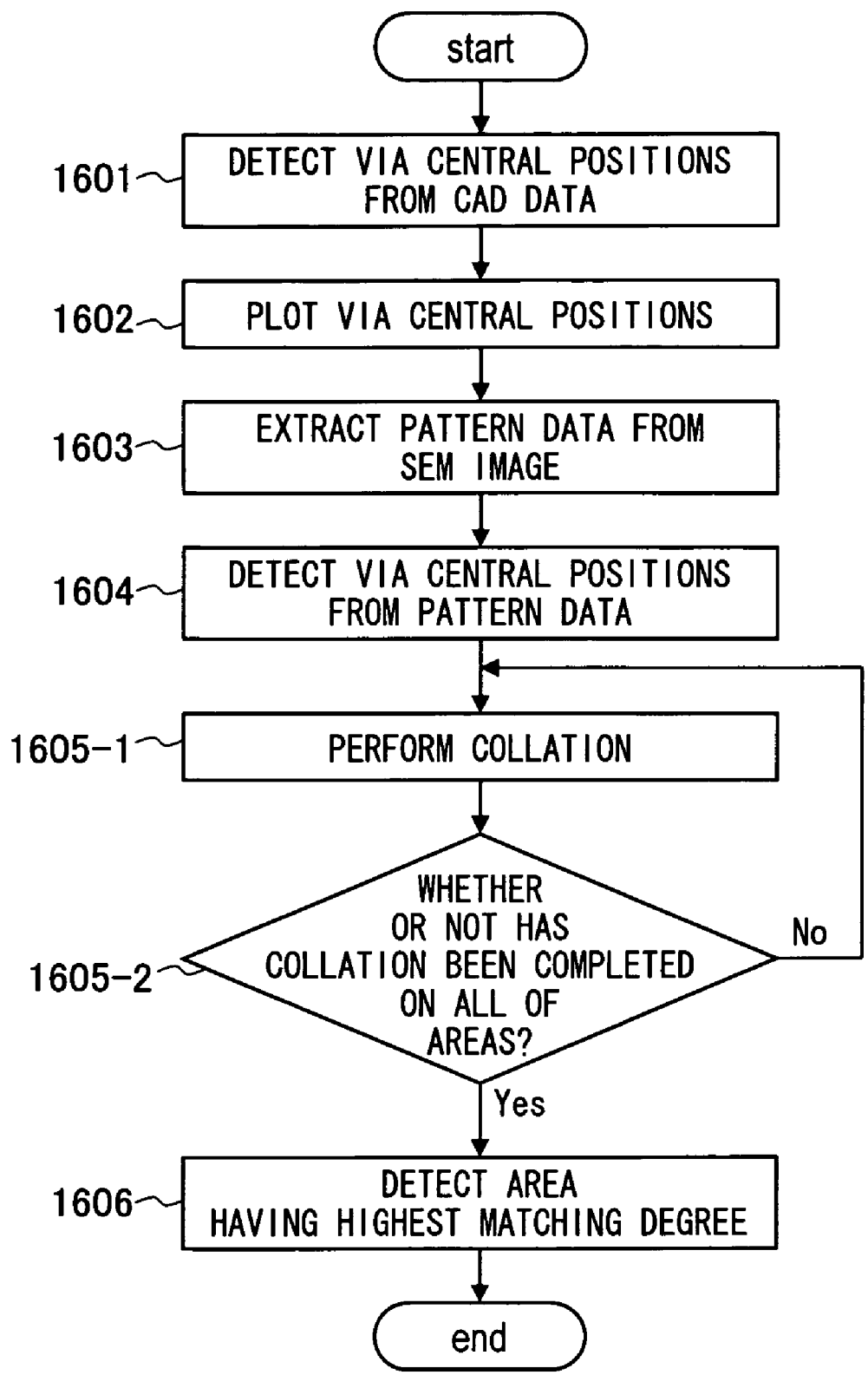
FIG. 16 is a flowchart showing a pattern detection procedure according to Example 1.

FIG. 16 is a flowchart showing a process flow according to Example 1. Software based on this flowchart is previously stored in the memory of the data calculation means 1703 in the computer 1700 shown in FIG. 17A. The patterns can be inspected by causing the CPU to read the software into a RAM and to execute the software at the time when the patterns are inspected.

After execution of processes with this software has been started, central positions of the respective hole patterns are detected from the CAD data 104 (Step 1601), and the central positions of the hole patterns are plotted in image data. Thereby, the CAD hole-pattern central-position data 111 is generated (Step 1602). Next, the pattern data 112 is extracted from the image data 105 (Step 1603), central positions of the respective hole patterns are detected from the pattern data 112, and the image hole-pattern central-position data 113 is generated (Step 1604). The matching degree of each of the areas in the image hole-pattern central-position data 113 with the CAD hole-pattern central-position data 111 is obtained though the collation process (Step 1605-1, 1605-2). Then, the area having the highest matching degree is outputted as the positional data 114 corresponding to the CAD data (Step 1606).

Figure 18:
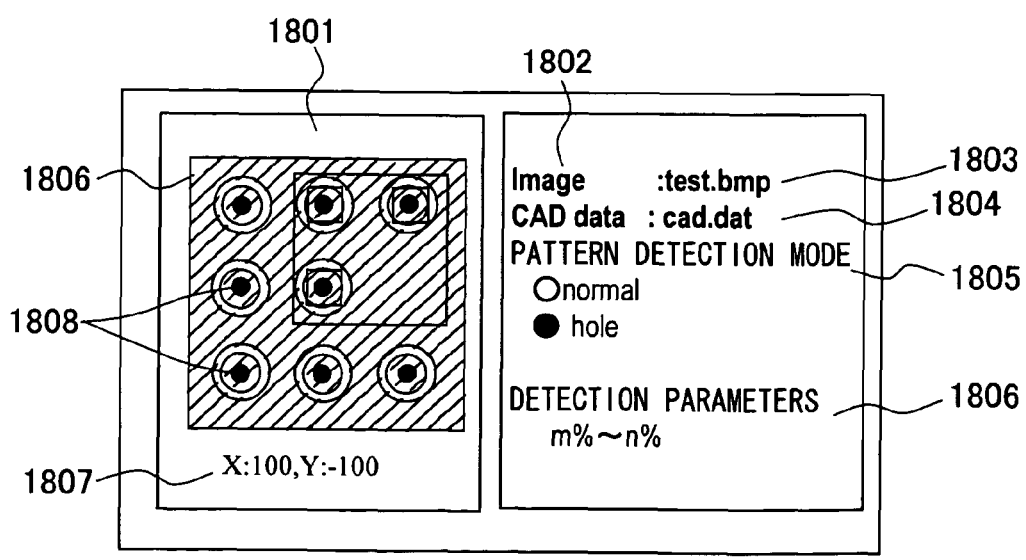
FIG. 18 is an illustration showing: a screen through which various parameters and the like used for executing a pattern inspection function by using a signal output interface of the pattern matching apparatus according to Example 1; and an inspection result thereof.

FIG. 18 is an illustration showing an example of a case where items of various parameters necessary for the pattern inspection, and a result of the pattern inspection by use of these parameters, are displayed in a GUI on the data display means 1702 of the computer 1700 shown in FIG. 17A. Data inputted to the data calculation unit 102 are information indicating the image data 105; information indicating the CAD data 104 of patterns to be detected from the image data 105; information used for selecting a pattern detection method; and the inspection parameters used for detecting central positions of the respective hole patterns. The operator inputs the variety of data through the signal input interface 101 with reference to the data display means 1702 while using the data input means 1704 composed of information input devices such as a key board and a mouse.

Figure 22:
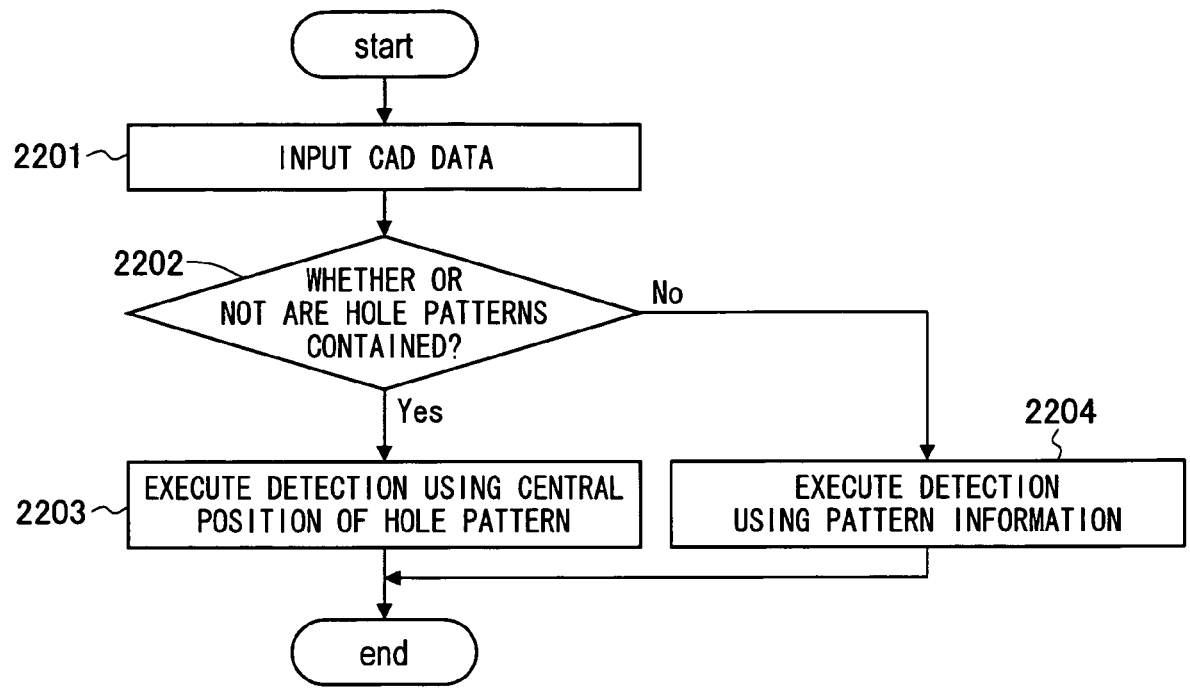
FIG. 22 is a flowchart showing a procedure in which pattern detection methods are automatically switched from one to another on the bases of contents of CAD data.

Note that the information used for selecting a pattern detection method indicates a method (normal) in which shapes in the CAD data 104 and shapes of the respective hole patterns in the image data 105 are directly collated with each other; and a pattern (hole pattern) inspection method according to the present invention. The method in which the shapes of the respective patterns are directly collated with each other is not limited because various publicly known technologies exist. An example of such method is, however, a pattern detection method using a normalization correlation method in which a correlation between images is calculated as in the case of the pattern inspection of the present invention. The method is previously installed in the data calculation means 1703, and has a configuration in which the pattern detection methods can be switched from one to another according to a specification by the operator. Incidentally, as to the switching of the pattern detection methods, automatic switching of the pattern detection methods without the specification by the operator is made possible by adding the following procedure. As shown in a flowchart of FIG. 22, in a step before the pattern inspection, it is determined whether hole patterns are included in the CAD data 104 with the procedure explained in FIGS. 3A to 3C (Step 2202). In a case where the hole patterns are included therein, the pattern detection of the present invention is then executed (Step 2203). In a case where the hole patterns are not included therein, another pattern detection method, such as the normalization correlation method, is executed (2204).

On the data display means 1702 shown in FIG. 18, displayed are a parameter window 1802 used for inputting various parameters and a data reference window 1801 used for displaying the CAD data 104 and the image data 105, which are based on the parameters, and a pattern matching result. In FIG. 18, an example of the parameter window 1802 is shown for a case where, by using image data 1803, such as "test.bmp," and CAD data 1804, such as "cad.dat," positional data corresponding to that in the CAD data 1804 is detected from the image data 1803 through a collation process 1805 using central positions of the respective hole patterns. Note that m % and N % are information 1806 respectively indicating the inspection parameters 1202 used for detecting central positions of the respective hole patterns from the image data 1803. In the data reference window 1801, there is shown a display example of a result of pattern detection based on settings in the parameter window 1802. This shows an image 1806 obtained by superposing the image data 105, the CAD data 104, and central positions 1808 of the respective hole patterns in the two pieces of foregoing data; and positional information 1807 of the CAD data, the positional information corresponding to that in the image data 1803. By performing display as described here, it is made possible to identify a position from which the pattern is detected, and to determine with reference to which points the pattern has been detected.

Figure 19:
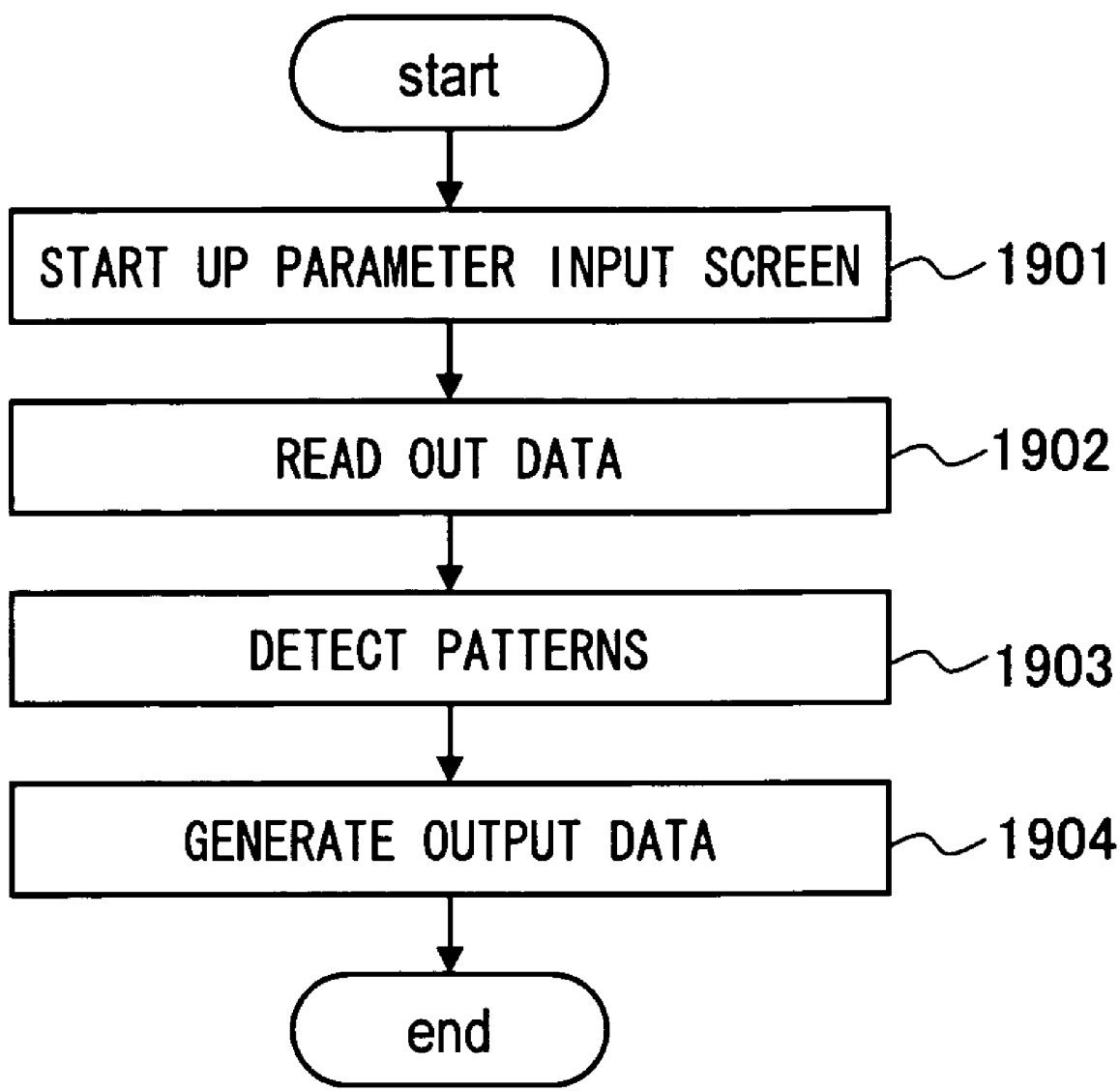
FIG. 19 is a flowchart showing a procedure in which a pattern inspection of the present invention is executed by using the screen shown in FIG. 18.

FIG. 19 is a flowchart showing a flow of a process which uses a display screen as shown in FIG. 18. Software based on this flowchart is previously stored in the memory of the data calculation means 1703 in the computer 1700 shown in FIG. 17A. The patterns can be inspected by causing the CPU to read the software into a RAM, and to execute the software at the time when the patterns are inspected.

After startup of a program of this software, a screen used for inputting the various parameters for inspecting the patterns is displayed in the signal output interface (Step 1901). The parameters having been inputted are read out, and are stored in the memory (Step 1902). The CAD data 104 and the image data 105, which have been specified, are read out from the memory. The pattern detection is then performed in accordance with the procedure shown in FIG. 16 (Step 1903). Thereafter, on the basis of the detected positional data 114, the CAD data 104 and central positions of the respective hole patterns are plotted in a corresponding one of positions in the image data 105 from which patterns have been detected. The resultant data is outputted to the memory or to the signal output interface 103 (Step 1904).

As has been described above, in Example 1, central position data on hole patterns can be detected both from CAD data and from an SEM image, and positional information of the image data corresponding to that in the CAD data can be detected through the collation process performed on the central position data in the CAD data with that in the SEM image.

EXAMPLE 2

Figure 20:
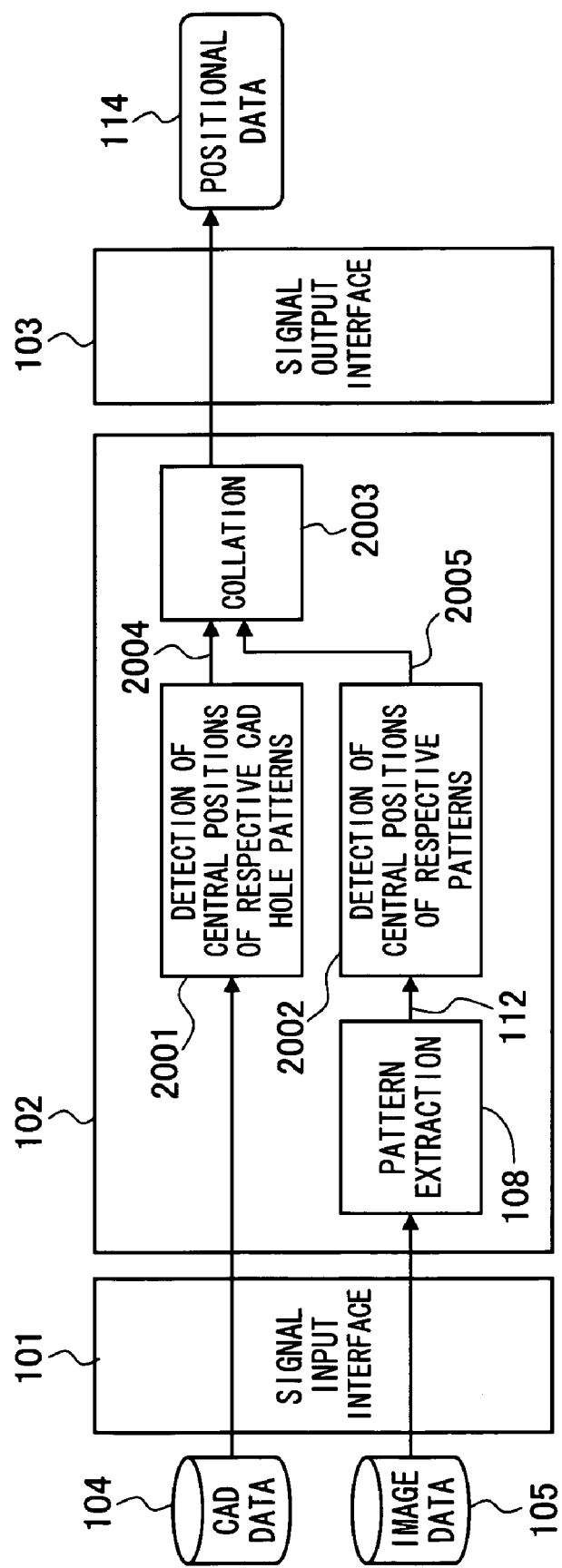
FIG. 20 is a block diagram showing a pattern matching apparatus according to Example 2.

Next, referring to FIG. 20, Example 2 will be described.

This example is characterized in that, by handling central positions of the respective hole patterns extracted from the CAD data 104 and from the image data 105, as coordinate data, reduction in amount of data and reduction in time for collating the data are made possible as compared to the case explained in Example 1 where central positions of the respective hole patterns are handled as image data.

Incidentally, in Example 2, explanations will be provided only for CAD hole-pattern detection means 2001, image hole-pattern central-position detection means 2002 and collation means 2003 which are different from the case of Example 1, and other explanations will be assisted with those in Example 1.

Figure 21D:
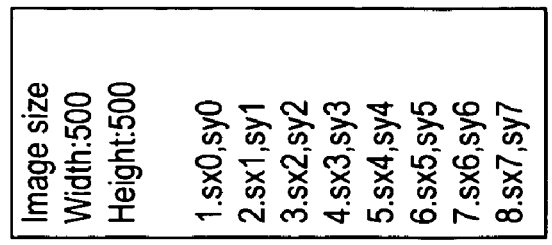
FIGS. 21A to 21D are diagrams showing a data format in a case of handling the central positions of the respective hole patterns in a form of coordinate information.
Figure 21C:
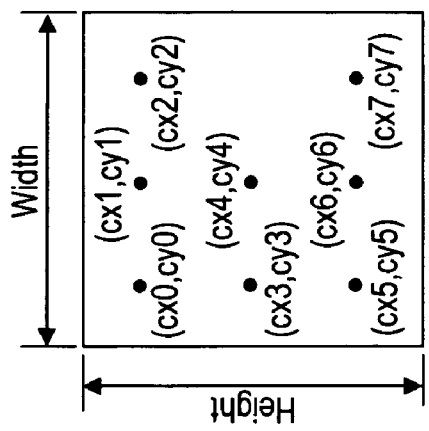
Figure 21B:
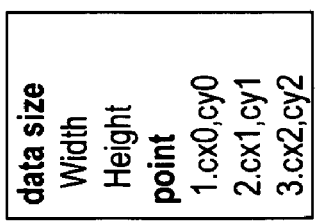
Figure 21A:
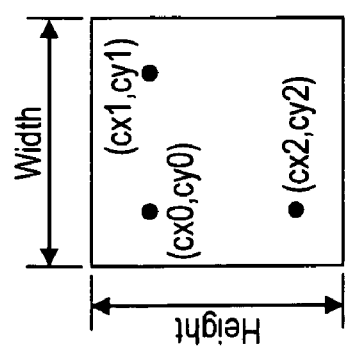

The CAD hole-pattern detection means 2001 detects CAD hole-pattern central positions with the method described in Example 1, and outputs coordinate data on the CAD hole-pattern central positions as CAD hole-pattern central position data 2004. In order for a collation range of patterns included in the CAD data 104 to be identified with the collation means 2003, the CAD hole-pattern detection means 2001 describes the collation range of the patterns in the CAD hole-pattern central position data 2004. For example, in a case where three points of CAD hole pattern central positions, as shown in FIG. 21A, have been detected in the CAD hole-pattern detection means 2001, the CAD hole-pattern detection means 2001 generates the CAD hole-pattern central position data 2004 in which, as shown in FIG. 21B, the collation range (Width, Height) and coordinate information on the respective central positions of the three hole patterns are described.

As has been described in Example 1, the image hole-pattern central-position detection means 2002 detects central positions respectively of image hole patterns, for example, through the voting process, and outputs coordinate data thereof as image hole-pattern central position data 2005. As in the case with the CAD hole-pattern central position data 2004, in order for a collation range of the image data 105 to be identified with the collation means, the image hole-pattern central-position detection means 2002 describes an image size of the image data 105 in the image hole-pattern central position data 2005. In a case where eight points of image hole-pattern central positions, as shown in FIG. 21C, have been detected, the image hole-pattern detection means 2002 generates the image hole-pattern central position data 2005 in which, as shown in FIG. 21D, the image size (Width, Height) of the image data 105, and coordinate information on the central positions of the respective eight hole patterns are described.

Incidentally, as has been described in Example 1, in a case where a central position of a corresponding one of hole patterns detected from the image data 105 extends across an area having a plurality of pixels, all of coordinate values of the plurality of pixels may be outputted as the coordinate data, or a single-pixel position having the largest vote value in the area may be outputted as the coordinate data.

By using the coordinate data which indicates centers of the respective hole patterns, and which is extracted from the CAD data 104 and from the image data 105, the collation means 2003 obtains a number of times when the coordinate data in each of areas in the image hole-pattern central position data 2005 are matched with those in the CAD hole-pattern central position data 2004. Then, the collation means 2003 outputs an area having the highest number of times among these areas as a position corresponding to that in the CAD data.

As described above, by handling central position information of hole patterns in the form of coordinate data, the pattern matching apparatus of Example 2 is more advantageous than that of Example 1 in that it is made possible to reduce an amount of data involved, and to shorten a collation process time.

Although the explanations have been mainly provided for the apparatuses in the above-mentioned examples, the scope of the present invention also includes a method using any one of the apparatuses and a program which executes the method by means of a computer.

INDUSTRIAL APPLICABILITY

The present invention is applicable to a semiconductor inspection apparatus.

What is claimed is:

1. A pattern matching apparatus comprising:
a memory; and
a processor configured to read out software stored in the memory and to execute the software, the software including:
a pattern extraction unit which extracts pattern data based on image data which is obtained by photographing hole patterns;
a first central-position data detection unit which detects first central-position data on the hole patterns based on the pattern data;
a second central-position data detection unit which detects second central-position data on corresponding hole patterns in CAD data; and
a first collation unit which collates the first central-position data with the second central-position data for pattern matching between the pattern data and the CAD data, wherein the first collation unit matches a portion of the first central-position data to the second central-position data and thereby detects positional information in the image data, the positional information corresponding to that in the CAD data.

2. The pattern matching apparatus according to claim 1, wherein:
the second central-position data detection unit generates the second central-position data in a form of image data,
the first central-position data detection unit generates the first central-position data in a form of image data, and
the first collation unit performs a process of collating the generated image data with each other.

3. The pattern matching apparatus according to claim 2, wherein:
the second central-position data detection unit generates the second central-position data in a form of coordinate data,
the first central-position data detection unit generates the first central-position data in a form of coordinate data, and
the first collation unit performs a process of collating the foregoing coordinate data, which have been generated, with each other.

4. The pattern matching apparatus according to claim 2, wherein:
the first central-position data detection unit includes an edge position detection unit for detecting edge positions in the pattern data and a voting unit for rendering the hole patterns to be detected respectively with a corresponding one of the detected edge positions at the center thereof by use of an addition method, and
the first central-position data detection unit generates image data emphasizing each of central positions of a corresponding one of hole patterns of which shapes respectively resemble shapes of the hole patterns to be detected which are included in the pattern data.

5. The pattern matching apparatus according to claim 4, wherein:
the software further includes an inspection parameter generation unit which calculates each of reference radii of the hole patterns from the CAD data, and
the first central-position data detection unit performs a voting process on each of the hole patterns on the basis of the reference radius.

6. The pattern matching apparatus according to claim 5, wherein the voting process is a process in which, on a voting data having the same size as an image, each of circular patterns having a radius R is rendered with a corresponding one of the edge positions at the center of the circular pattern, in which the rendering process is performed on all of positions respectively of edge pixels, and in which a number of times when the circular pattern is rendered in the voting data at the time of rendering is memorized.

7. The pattern matching apparatus according to claim 4, wherein the first central-position data detection unit includes a voting unit for rendering, by use of an addition method, each of the plurality of hole patterns with a corresponding one of the detected edge positions at the center of the hole pattern, the plurality of hole patterns being obtained by varying, in a stepwise manner, a size of a corresponding one of the hole patterns to be detected.

8. The pattern matching apparatus according to claim 1, wherein the software further includes an image data synthesis unit for generating image data in which the image data, the CAD data and the first central-position data are superposed on one another on the basis of the positional information in the image data corresponding to that in the CAD data.

9. The pattern matching apparatus according to claim 8, further comprising a display unit for displaying the image data in which the image data, the CAD data and the first central-position data are superposed on one another.

10. The pattern matching apparatus according to claim 1, wherein the software further includes:
   a second collation unit which detects the positional information in the image data corresponding to that in the CAD data by collating the pattern data directly with the CAD data;
   a CAD data analysis unit which automatically determines, by analyzing the CAD data, that an inspection subject includes hole patterns; and
   a switching operation unit which performs pattern matching by switching the first and second collation units on the basis of a result of the analysis of the CAD data.

11. A pattern matching apparatus comprising:
a memory; and
a processor configured to read out software stored in the memory and to execute the software, the software including:
   a first central-position data detection unit which detects first central-position data on patterns on the basis of image data on the patterns;
   a second central-position data detection unit which detects second central-position data on corresponding patterns in CAD data; and
   a collation unit which collates the first central-position data with the second central-position data for pattern matching between the patterns based on the image data and the patterns in the CAD data, wherein the collation unit matches a portion of the first central-position data to the second central-position data and thereby detects positional information in the image data, the positional information corresponding to that in the CAD data; and
   a pattern-type discrimination unit which detects, on the basis of the CAD data, that the image data to be inspected is that on patterns corresponding to those in the CAD data.

12. A pattern matching apparatus comprising:
a memory; and
a processor configured to read out software stored in the memory and, to execute the software, the software including:
   a first central-position data detection unit which detects first central-position data on hole patterns on the basis of image data on the hole patterns;
   a second central-position data detection unit which detects second central-position data on hole patterns in CAD data on the basis of the CAD data used in forming the hole patterns;
   a collation unit which collates the first central-position data with the second central-position data, and which thereby detects positional information in the image data, the positional information corresponding to that in the CAD data; and
   a hole pattern radius calculation unit which checks on each of reference radii of the hole patterns from the CAD data, and which calculates, from each of the reference radii, a radius of a corresponding one of the hole patterns in the image data.

13. A pattern matching apparatus comprising:
a memory; and
a processor configured to read out software stored in the memory and to execute the software, the software including:
   a first central-position data detection unit which detects first central-position data on hole patterns on the basis of image data on the hole patterns;
   a second central-position data detection unit which detects second central-position data on hole patterns in CAD data on the basis of the CAD data used in forming the hole patterns; and
   a collation unit which collates the first central-position data with the second central-position data, and which thereby detects positional information in the image data, the positional information corresponding to that in the CAD data;
   wherein, through a voting process, the first central-position data detection unit detects, from the image data, each of central positions of a corresponding one of a plurality of hole patterns which are different in size from that of one another.

14. A semiconductor inspection system comprising:
an image data acquisition unit which acquires image data;
a computer configured to read out software stored in a memory and to execute the software, the software including:
   a first central-position data detection unit which detects first central-position data on patterns on the basis of the image data on the patterns acquired by the image data acquisition unit;
   a second central-position data detection unit which detects second central-position data on corresponding patterns in CAD data; and
   a collation unit which collates the first central-position data with the second central-position data for pattern matching between the patterns acquired by the image data acquisition unit and the patterns in the CAD data, wherein the collation unit matches a portion of the first central-position data to the second central-position data and thereby detects positional information in the image data, the positional information corresponding to that in the CAD data.

15. A semiconductor inspection system comprising:
an image data acquisition unit which acquires image data;
a computer configured to read out software stored in a memory and to execute the software, the software including:
   a first central-position data detection unit which detects first central-position data on patterns on the basis of the image data on patterns acquired by the image data acquisition unit;
   a second central-position data detection unit which detects second central-position data on corresponding patterns in CAD data;
   a collation unit which collates the first central-position data with the second central-position data for patterns matching between the patterns acquired by the image data acquisition unit and the patterns in the CAD data, wherein the collation unit matches a portion of the first central-position data to the second central-position data and thereby detects positional information in the image data, the positional information corresponding to that in the CAD data; and
   a display control unit which performs control of displaying, on a display unit, a parameter window used for inputting various parameters and a data reference window used for displaying the CAD data and the image data, which are based on the parameters, and a pattern matching result.

16. The semiconductor inspection system according to claim 15, wherein the display control unit performs control of displaying, on the basis of the positional information, at least any one of: an image obtained by superposing the image data, the CAD data and the central-position data on the patterns on one another; and positional information in the CAD data, the positional information corresponding to that in the image data.

17. The semiconductor inspection system according to claim 15, wherein the computer includes a control unit which controls the image data acquisition unit.

18. A semiconductor inspection system comprising:
a computer configured to read out software stored in a memory and to execute the software, the software including:
   a data reception unit which is capable of receiving CAD data and image data obtained with a microscope via any one of a network and an externally connected memory;
   a first central-position data detection unit which detects first central-position data on patterns on the basis of the image data on the patterns acquired by the data reception unit;
   a second central-position data detection unit which detects second central-position data on corresponding patterns in the CAD data; and
   a collation unit which collates the first central-position data with the second central-position data for pattern matching between the patterns acquired by the data reception unit and the patterns in the CAD data, wherein the collation unit matches a portion of the first central-position data to the second central-position data and thereby detects positional information in the image data, the positional information corresponding to that in the CAD data.

19. A pattern matching apparatus comprising:
a memory; and
a processor configured to read out software stored in the memory and to execute the software, the software including:
   a first central-position data detection unit which detects first central-position data on patterns on the basis of image data on the patterns;
   a second central-position data detection unit which detects second central-position data on corresponding patterns in CAD data; and
   a collation unit which collates the first central-position data with the second central-position data for pattern matching between the patterns on the basis of the image data and the patterns in the CAD data, wherein the collation unit matches a portion of the first central-position data to the second central-position data and thereby detects positional information in the image data, the positional information corresponding to that in the CAD data.

20. A non-transitory computer readable recording medium on which is recorded a program that causes a computer, which is connected to a scanning electron microscope that forms an image based on electrons obtained by scanning an electron beam over a sample, to execute a detection process for pattern matching between a pattern in the image formed by the scanning electron microscope with a pre-registered pattern by matching the pattern in the image formed by the scanning electron microscope with the pre-registered pattern, and to identify a desired position through the detection process, wherein
the program causes the computer to:
   generate first central-position data on a hole pattern included in design data of a semiconductor device, and to generate second central-position data on a hole pattern in image data obtained by the scanning electron microscope, and
   detect a position of the hole pattern in the image data by collating the first central-position data with the second central-position data in such a manner as to match the first central-position data with the second central-position data.

* * * * *